(12) United States Patent
Liu et al.

(10) Patent No.: US 11,720,353 B2
(45) Date of Patent: Aug. 8, 2023

(54) PROCESSING APPARATUS AND PROCESSING METHOD

(71) Applicant: Shanghai Cambricon Information Technology Co., Ltd., Pudong New Area (CN)

(72) Inventors: Shaoli Liu, Pudong New Area (CN); Yuzhe Luo, Pudong New Area (CN); Qi Guo, Pudong New Area (CN); Tianshi Chen, Pudong New Area (CN)

(73) Assignee: SHANGHAI CAMBRICON INFORMATION TECHNOLOGY CO., LTD, Shanghai (CN)

( * ) Notice: Subject to any disclaimer, the term of this patent is extended or adjusted under 35 U.S.C. 154(b) by 820 days.

(21) Appl. No.: 16/697,637

(22) Filed: Nov. 27, 2019

(65) Prior Publication Data

US 2020/0117976 A1 Apr. 16, 2020

Related U.S. Application Data

(63) Continuation of application No. 16/476,262, filed as application No. PCT/CN2018/083415 on Apr. 17, 2018, now Pat. No. 11,531,540.

(30) Foreign Application Priority Data

Apr. 19, 2017 (CN) .......................... 201710256445.X (51) Int. Cl.
*G06F 9/30* (2018.01)
*G06N 3/04* (2023.01)
(Continued)

(52) U.S. Cl.
CPC .................. *G06F 9/30* (2013.01); *G06F 7/46* (2013.01); *G06F 9/30007* (2013.01); *G06N 3/04* (2013.01); *G06N 3/08* (2013.01)

(58) Field of Classification Search
CPC .................................................. G06F 9/30007
See application file for complete search history.

(56) References Cited

U.S. PATENT DOCUMENTS 7,398,347 B1 * 7/2008 Pechanek ............ G06F 9/30145
711/100
9,189,200 B1 11/2015 Langhammer
(Continued)

FOREIGN PATENT DOCUMENTS

CN          101038681 A       9/2007
CN          101527010 A       9/2009
(Continued)

OTHER PUBLICATIONS

PCT/CN2018/083415—International Search Report, dated Jul. 20, 2018, 10 pages, (no English translation).
(Continued)

*Primary Examiner* — Michael J Metzger
(74) *Attorney, Agent, or Firm* — Getech Law LLC; Jun Ye (57) ABSTRACT

The present disclosure provides a processing device and method. The device includes: an input/output module, a controller module, a computing module, and a storage module. The input/output module is configured to store and transmit input and output data; the controller module is configured to decode a computation instruction into a control signal to control other modules to perform operation; the computing module is configured to perform four arithmetic operation, logical operation, shift operation, and complement operation on data; and the storage module is configured to temporarily store instructions and data. The present disclosure can execute a composite scalar instruction accurately and efficiently.

13 Claims, 4 Drawing Sheets

(51) Int. Cl.
  *G06N 3/08* (2023.01)
  *G06F 7/46* (2006.01)

(56) References Cited

U.S. PATENT DOCUMENTS

| | | | |
|---|---|---|---|
| 2001/0042188 A1* | 11/2001 | Tremblay | G06F 9/3851 718/107 |
| 2005/0257026 A1 | 11/2005 | Meeker | |
| 2009/0198974 A1* | 8/2009 | Barowski | G06F 7/57 712/222 |
| 2009/0271465 A1 | 10/2009 | Pistorius et al. | |
| 2011/0055308 A1 | 3/2011 | Mantor et al. | |
| 2014/0164457 A1 | 6/2014 | Chaudhuri | |
| 2014/0208081 A1 | 7/2014 | Yap | |
| 2015/0046671 A1 | 2/2015 | Ould-Ahmed-Vall | |
| 2016/0328647 A1 | 11/2016 | Lin et al. | |
| 2017/0102920 A1 | 4/2017 | Henry et al. | |

FOREIGN PATENT DOCUMENTS

| | | | |
|---|---|---|---|
| CN | 101571796 | A | 11/2009 |
| CN | 101599828 | A | 12/2009 |
| CN | 101685388 | A | 3/2010 |
| CN | 103699360 | A | 4/2014 |
| CN | 104011657 | A | 8/2014 |
| CN | 104699458 | A | 6/2015 |
| CN | 105005911 | A | 10/2015 |
| CN | 105207794 | A | 12/2015 |
| CN | 105359129 | A | 2/2016 |
| CN | 105426160 | A | 3/2016 |
| CN | 105453071 | A | 3/2016 |
| CN | 105512723 | A | 4/2016 |
| CN | 106066783 | A | 11/2016 |
| CN | 106447034 | A | 2/2017 |
| CN | 106528047 | A | 3/2017 |
| EP | 0428942 | A2 | 5/1991 |
| EP | 0428942 | A3 | 5/1991 |

OTHER PUBLICATIONS

CN 201710264686.9—Second Office Action, dated Dec. 23, 2020, 10 pages, (No English translation).
CN 201710264686.9—Third Office Action, dated Mar. 18, 2021, 12 pages, (no English translation).
Xu Jianbang, et.al, "National Defense Industry Press", DSP Algorithm and Architecture Realization Technology, Jan. 31, 2010, 4 pages, (no English translation).
CN 201710256445.X—First Office Action, dated Sep. 25, 2020, 10 pages (no English translation).
Tao Wang, et al., "The Study and Realization of Instruction Folding in Java Processor", Computer Research and Development, vol. 37 No. 1, Jan. 31, 2000, 5 pages, (with English abstract).
Yigang Zhang, "Harbin Institute of Technology Press" MCS-51 Singer Chip Microcomputer Application Design, 2nd Edition, Dec. 31, 1997, 3 pages, (no English translation).
CN 201710269049.0—First Office Action, dated May 15, 2020, 7 pages, (no English translation).
CN 201710269106.5—Second Office Action, dated Nov. 3, 2020, 5 pages, (no English translation).
CN 201711468817.1—First Office Action, dated Dec. 8, 2020, 8 pages, (no English translation).
CN 201811097569.9—First Office Action, dated Aug. 3, 2020, 11 pages, (no English translation).
EP 18788355.8—Extended European Search Report, dated Jan. 22, 2021, 8 pages.
EP 18788355.8—Response to the Communication under Rules 161 and 162 EPC dated Nov. 26, 2019, filed Feb. 4, 2020, 18 pages.
Taesik Na, et al., "Speeding Up Convolutional Neural Network Training with Dynamic precision Scaling and Flexible Mlultiplier-Accumulator", ISLPED, Aug. 2016, 6 pages.
KR 10-2019-7025307—Response to Office Action, filed Feb. 9, 2021, 22 pages, (no English translation).
KR 10-2019-7025307—Office Action, dated Dec. 28, 2020, 3 pages, (no English translation).
JP 2019-228383—First Office Action, 2019, 5 pages, (no English translation).
EP 19214371.7—Extended European Search Report, dated Jan. 25, 2021, 9 pages.
EP 19214320.4, European Search Report dated Mar. 24, 2020, 8 pages.
CN 201710264686.9, Official Action dated Apr. 17, 2020, 11 pages. (No English Translation).
CN 201710269106.5, Official Action dated Mar. 26, 2020, 11 pages. (No English Translation).
CN 201811097653.0, Official Action dated Apr. 30, 2020, 8 pages, (No English Translation).
Article 296-302 "Binary Number Multiplier" 2020, 19 pages (11 pages of Translation, 8 pages of Article).
EP 19 214 320.4, Communication pursuant to Article 94(3), 6 pages.
JP 2019-549467 Notice of Reason for Refusal, dated Jan. 19, 2021, 14 pages, (with English translation).
CN201880000923.3—Office Action dated Mar. 31, 2023, 25 pages. (With Brief English Explanation).

\* cited by examiner

Basic instruction format

| Opcode | Source operand reference 1 | Source operand reference 2 | Target address |
|---|---|---|---|

FIG. 4

Addition instruction (register addressing)

| 0001 | 01 | Register number of source operand 1 | Register number of source operand 2 | Target address |
|---|---|---|---|---|

Opcode
Addressing mode flag

FIG. 5

Addition instruction (register indirect addressing)

| 0001 | 10 | The number of register where the address of source operand 1 exists | The number of register where the address of source operand 2 exists | Target address |
|---|---|---|---|---|

Opcode
Addressing mode flag

FIG. 6

Addition instruction (immediate operand)

| 0001 | 00 | 0 | Source operand 1 | Source operand 2 | Target address |
|---|---|---|---|---|---|

Opcode
Addressing mode flag
Data type flag

FIG. 7

Addition instruction (RAM addressing)

| 0001 | 11 | Address of RAM unit where source operand 1 exists | Address of RAM unit where source operand 2 exists | Target address |
|---|---|---|---|---|

Opcode
Addressing mode flag

PROCESSING APPARATUS AND PROCESSING METHOD

TECHNICAL FIELD

The present disclosure relates to instruction sets and computation method and implementation of instructions sets, and further relates to a device and a method supporting a composite scalar instruction, which can be applied to image processing, digital processing, smart devices, on-chip network data computation, and the like.

BACKGROUND

With the coming of the big data era, composite scalar instructions are more frequently used in a variety of situations, and it is of great importance to execute composite scalar instructions accurately and efficiently. In modern smart chips, scalar instructions have been widely applied in various algorithms.

Conventional scalar instructions distinguish between floating-point instructions and fixed-point instructions by opcodes, for instance, fixed-point addition instructions and floating-point addition instructions have different opcodes. This method may make instruction sets and decoding logic complex.

Another method is to add a flag bit of a representation type explained by hardware to data, so as to distinguish whether data used by an instruction is floating-point or fixed-point. This method does not reduce the size of an instruction set, and may generally only apply to the case where an operand is immediate. It is also possible to add a flag bit to data, which may increase space required for storage.

SUMMARY

(I) Technical Problem to be Solved

In view of the above-mentioned problems and based on research of composite scalar instructions, the present disclosure provides a composite scalar instruction, a device and a computation method supporting a composite scalar instruction to overcome at least one of the technical problems.

(II) Technical Solutions

The present disclosure provides a device supporting a composite scalar instruction, including a controller module, a storage module, and a computing module. The storage module may be configured to store a composite scalar instruction and data, the data may have more than one type, and different types of data may be stored in different addresses in the storage module; the controller module may be configured to read the composite scalar instruction from the storage module and decode the composite scalar instruction into a control signal; the computing module may be configured to receive the control signal, read data from the storage module, determine a data type according to an address of the read data, and compute the data.

Optionally, the data may include original data and intermediate data; the device may further include an input/output module configured to transmit the original data and the composite scalar instruction to the storage module; and the computing module may be configured to store an intermediate result of computation in the storage module, and transmit a final computation result to the input/output module.

Optionally, the composite scalar instruction may be an instruction that combines a floating-point instruction and a fixed-point instruction, the composite scalar instruction may include an opcode field, an operand address field, and a destination address field, a type of the instruction may not be distinguished in a decoding stage, and a data type may be determined according to an address in an address field of the operand upon computation; where an opcode stored in the opcode field may be used for distinguishing operations of different types, the operand address field may be used for distinguishing types of operands, and the target address field may be an address where a computation result is stored.

Optionally, the different types of data may include floating-point data and fixed-point data; the storage module may include a register file, RAM, and/or ROM; and the different addresses may include different RAM address and/or different register numbers.

Optionally, the computing module may be configured to determine whether data read by the computing module is floating-point data or fixed-point data according to a RAM address or a register number used by the data.

The present disclosure provides a composite scalar instruction including an opcode field, an operand address field, and a destination address field; where an opcode stored in the opcode field may be used for distinguishing operations of different types, the operand address field may be used for distinguishing types of operands, and the target address field may be an address where a computation result is stored.

Optionally, the operand address field may include a RAM address, a register number, or an immediate operand, and the target address field may include a RAM address and a register number.

Optionally, when the operand address field stores an immediate operand, the composite scalar instruction may further include a data type flag bit for distinguishing between floating-point data and fixed-point data.

Optionally, when multiple addressing modes are used for reading data, the composite scalar instruction may further include a flag bit for determining the addressing modes, and the multiple addressing modes may include register addressing, register indirect addressing, RAM addressing, and immediate operand addressing.

The present disclosure provides a method supporting a composite scalar instruction including:

S1: storing data of different types in different addresses;

S2: decoding a composite scalar instruction into a control signal;

S3: reading operation data according to the control signal, and determining a type of the operation data according to an address of the operation data, and performing operation on the operation data, and S4: storing a computation result in an address of a corresponding type.

The present disclosure also provides a processor configured to execute a composite scalar instruction, where the composite scalar instruction may include an opcode field, an operand address field, and a destination address field; and the opcode stored in the opcode field may be used to distinguish different types of operation, the operand address field may be used to distinguish types of the operand, and the destination address field may be an address where an operation result is stored.

The present disclosure also provides a method for executing a composite scalar instruction, including: storing different types of data in different addresses; decoding a composite scalar instruction into a control signal; reading operation data according to the control signal, determining a type of the operation data according to an address of the read operation data, and performing operation on the operation data; and storing an computation result in an address of a corresponding type.

(III) Technical Effects (1) The composite scalar instruction provided by the present disclosure is an instruction for unifying a floating-point instruction and a fixed-point instruction, and the floating-point instruction and the fixed-point instruction are unified to a large extent, and a type of the instruction is not distinguished in a decoding stage. During computation, it is determined whether an operand is floating-point data or fixed-point data according to an address in an operand address field, which may simplify the decoding logic of the instruction and make an instruction set more compact.

(2) The device supporting a composite scalar instruction provided by the present disclosure may provide an efficient execution environment for a composite scalar instruction.

(3) The method supporting a composite scalar instruction provided by the present disclosure may be able to perform a composite scalar instruction accurately and efficiently.

DETAILED DESCRIPTION

The technical solutions in the examples of the present disclosure are clearly and completely described below with reference to the drawings in the examples of the present disclosure. Apparently, the described examples are only a part of the examples of the present disclosure, rather than all of the examples. All other examples obtained by a person of ordinary skill in the art based on the examples of the present disclosure without creative efforts are within the scope of the present disclosure.

The "memory" described in the present disclosure may be integrated within a processing device with dynamically configurable computation bit width, or may be a separate device, as an external memory for data transmission with a processing device with dynamically configurable computation bit width.

The present disclosure provides a computation device and a computation method supporting a composite scalar instruction. By providing composite scalar instructions (instructions that unify a floating-point instruction and a fixed-point instruction) in computation, the floating-point instruction and the fixed-point instruction may be unified to a large extent, so that the type of the instruction may not be distinguished in a decoding stage, and it may be determined whether an operand is floating-point data or fixed-point data according to an address in an address field of the operand upon specific computation, which may simplify decoding logic of the instruction and also simplify an instruction set. This is demonstrated in detail below with reference to specific examples.

Figure 1:
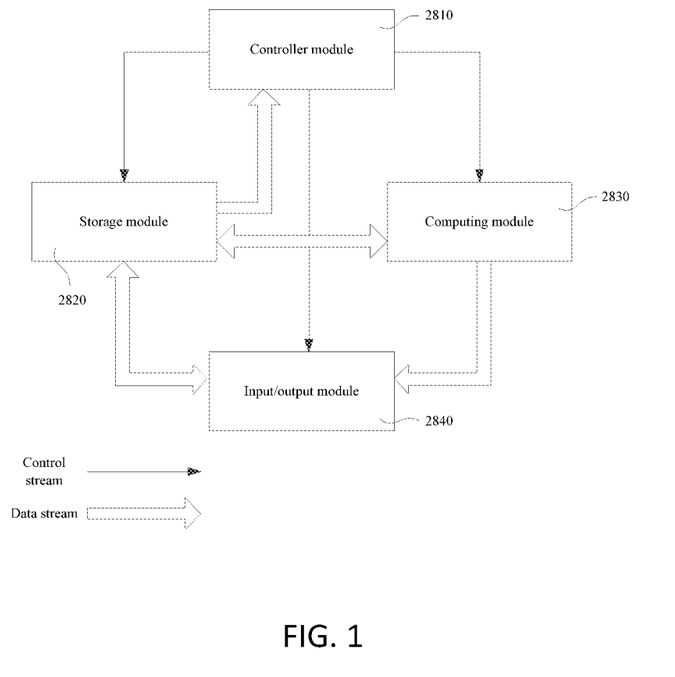
FIG. 1 is a structural schematic diagram of a computation device according to an example of the present disclosure.

FIG. 1 is a schematic diagram of a device supporting a composite scalar instruction provided by an example of the present disclosure. As shown in FIG. 1, the device may include a controller module 2810, a storage module 2820, a computing module 2830, and an input/output module 2840.

The controller module 2810 may be configured to read an instruction from the storage module and store the instruction in a local instruction queue, and then decode the instruction in the instruction queue into a control signal to control behavior of the storage module, the computing module, and the input/output module.

The storage module 2820 may include storage devices such as a register file, a RAM, and a ROM for storing different data such as instructions and operands. The operands may include floating-point data and fixed-point data. The storage module may store the floating-point data and the fixed-point data in space corresponding to different addresses, for instance, different RAM addresses or different register numbers, so that it can be determined whether data which is read is a floating-point or a fixed-point data based on an address and a register number.

The computing module 2830 can perform operation such as four arithmetic operation, logical operation, shift operation, and complement operation on floating-point data and fixed-point data, where the four arithmetic operation may include four types of operation of addition, subtraction, multiplication, and division; the logical operation may include four operations of AND, OR, NOT, and XOR. After receiving a control signal of the controller module, the computing module can determine whether data which is read is data of a floating-point type or data of a fixed-point type by reading an address or a register number where an operand is located, the computing module may read data to be operated from the storage module and perform corresponding computation, an intermediate result of the computation may be stored in the storage module, and a final computation result may be stored in the input/output module.

The input/output module 2840 may be configured to store and transmit input and output data. During initialization, the input/output module may store the initial input data and a compiled composite scalar instruction into the storage module, and receive a final computation result transmitted from the computing module after the computation ends. Besides, the input/output module can also read information required by compiling the instruction from the memory for a computer compiler to compile a program into various instructions.

It can be seen that the device supporting a composite scalar instruction provided by the example of the present disclosure may provide an efficient execution environment for the composite scalar instruction.

Figure 2:
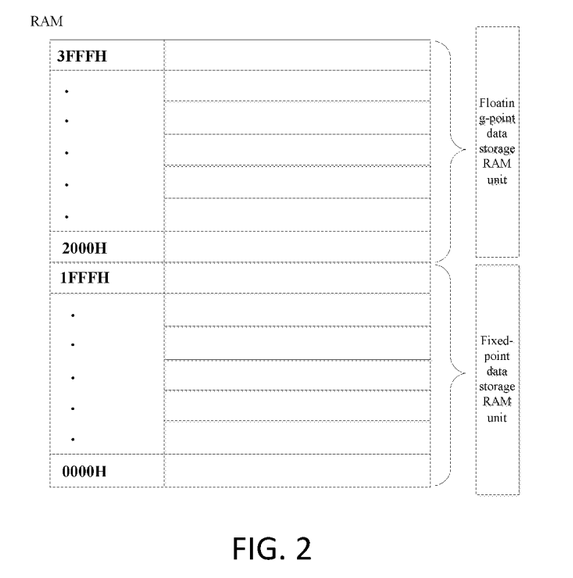
FIG. 2 is an exemplary diagram showing an organization form of a storage module RAM provided in an example of the present disclosure.
Figure 3:
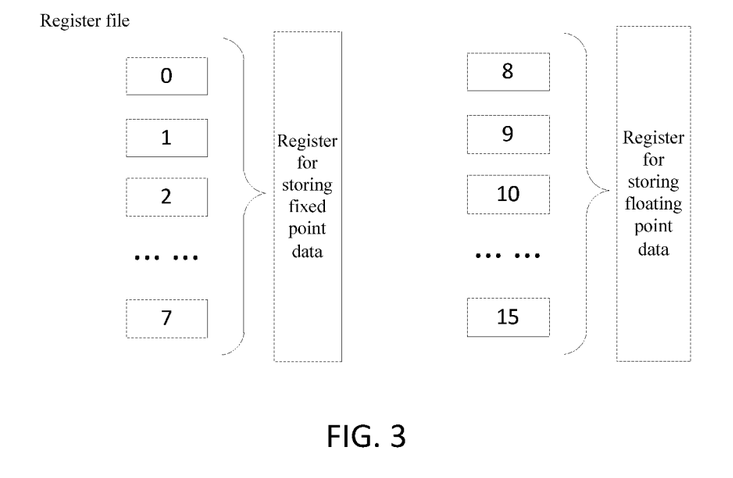
FIG. 3 is an exemplary diagram showing an organization form of a storage module register file provided in an example of the present disclosure.

FIG. 2 and FIG. 3 are diagrams showing organization forms of a storage module provided in an example of the present disclosure. The storage module may store floating-point data and fixed-point data in different address spaces, such as different addresses or different register numbers, so that it can be determined whether the read data is a floating-point number or a fixed-point number according to an address and register number.

In this example, the present disclosure shows how to separate the storage of floating-point numbers from the storage of fixed-point numbers by using, as an instance, a storage module, including a RAM having a start address of 0000H and a termination address of 3FFFH, and a register file consisting of 16 registers. As shown in FIG. 2, in the RAM, the fixed-point data may be stored only in the RAM units of the address 0000H to 1FFFH, and the floating-point data may be stored only in the RAM units of 2000H to 3FFFH, and the instruction can be stored in any RAM unit, also the unchanged information in the instruction set can be stored in a ROM. As shown in FIG. 3, in the register file, fixed-point data may exist only in registers 0 to 7, and floating-point data may exist only in registers 8 to 15. When the value stored in the register is the RAM address, registers 0 to 7 may be used to store the RAM address of the fixed-point data, and registers 8 to 15 may be used to store the RAM address of the floating-point data.

Figure 4:
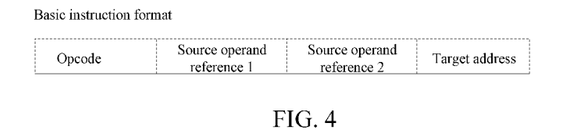
FIG. 4 is an exemplary diagram of a composite scalar instruction provided in an example of the present disclosure.

FIG. 4 is a diagram of a composite scalar instruction provided in an example of the present disclosure. As shown in FIG. 4, each instruction may have an opcode field, an operand address field (or immediate operand), and a target address field. The opcode field may include opcodes, and the operand address field may include a source operand reference 1 and a source operand reference 2, representing storage address of each source operand, and the target address field may be a storage address of an operand computation result.

The opcode field is used to distinguish operations of different types, such as addition, subtraction, multiplication, and division, but is not used to distinguish the type of operands.

The operand address field may contain a RAM address, a register number, and an immediate operand. The RAM address and the register number used to store floating-point data and fixed-point data may be different, so the address field can be used to distinguish floating-point operands and fixed-point operands. When the operand address field stores an immediate operand, a data type flag bit recognizable by the computing module may also be needed to distinguish the floating-point operands from the fixed-point operands.

The target address field can be either a RAM address or a register number. The address field should correspond to the operand type. In other words, a computation result of the floating-point operand may be stored in a storage unit corresponding to the floating-point data; the computation result of the fixed-point operand may be stored in a storage unit corresponding to the fixed-point data.

In view of the foregoing, the composite scalar instruction provided by the present disclosure is an instruction that unifies the floating-point instruction and the fixed-point instruction, and the composite scalar instruction may unify the floating-point instruction and the fixed-point instruction to a large extent, so that the type of an instruction may not be distinguished in the decoding stage, and it may be determined whether an operand is floating-point data or fixed-point data according to an address of the read operand in an operand address field upon specific computation, which may simplify decoding logic of the instruction and also simplify an instruction set.

Besides, for the composite scalar instruction provided by the present disclosure, if multiple addressing modes are used, it may also be necessary to add a flag bit for determining the addressing modes.

Figure 5:
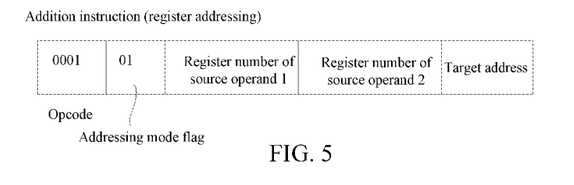
FIG. 5 is an exemplary diagram of a composite scalar instruction when register addressing is used, provided in an example of the present disclosure.
Figure 6:
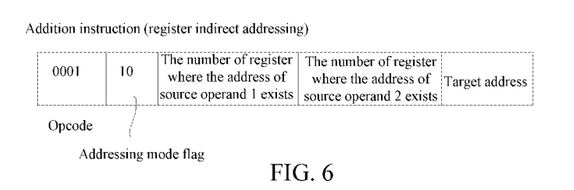
FIG. 6 is an exemplary diagram of a composite scalar instruction when register indirect addressing is used, provided in an example of the present disclosure.

For instance, when the organization forms of a storage module shown in FIGS. 5 and 6 are used, the opcode of the addition instruction is 0001; when multiple addressing modes are used, the composition of the composite scalar instruction is as shown in FIG. 5 to FIG. 8.

FIG. 5 is an exemplary diagram of a composite scalar instruction when register addressing is used provided by the example of the present disclosure. As shown in FIG. 5, when register addressing is used, the addressing mode flag bit is 01, source operand 1 and source operand 2 are stored respectively in the registers corresponding to the register numbers of source operand 1 and source operand 2, fixed-point data is stored in registers numbered 0 to 7, and floating-point data is stored in registers numbered 8 to 15.

FIG. 6 is an exemplary diagram of a composite scalar instruction when register indirect addressing is used, provided in an example of the present disclosure. As shown in FIG. 6, when register indirect addressing is used, an addressing mode flag bit is 10, and addresses of the source operand 1 and source operand 2 in the RAM are stored respectively in registers corresponding to the register numbers of source operand 1 and source operand 2, where the RAM addresses of the fixed-point data (0000H to 1FFFH) are stored in registers numbered 0 to 7, and the RAM addresses of floating-point data (2000H to 3FFFH) are stored in registers numbered 8 to 15. The target address field stores target register numbers or target RAM addresses. The fixed-point data is stored in a RAM unit having an address in the range of 0000H to 1FFFH; and the floating-point data is stored in a RAM unit having an address in the range of 2000H to 3FFFH.

Figure 7:
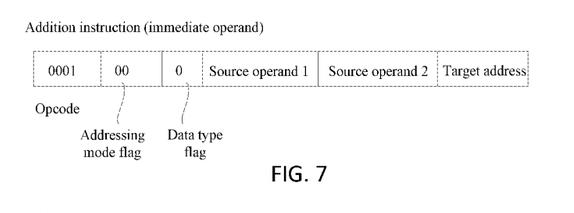
FIG. 7 is an exemplary diagram of a composite scalar instruction when immediate operand addressing is used, provided in an example of the present disclosure.

FIG. 7 is an exemplary diagram of a composite scalar instruction when immediate operand addressing is used, provided in an example of the present disclosure. As shown by FIG. 7, if the data in the operand address fields are two immediate operands, the addressing mode flag bit is 00, and a data type flag bit is also set between the addressing mode flag bit and the operand address field. When the immediate operand is a fixed-point type, the data type flag bit is 0; and when the immediate operand is a floating-point type, the data type flag bit is 1.

Figure 8:
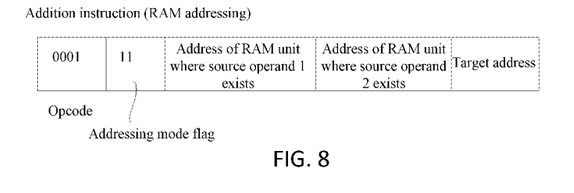
FIG. 8 is an exemplary diagram of a composite scalar instruction when RAM addressing is used, provided in an example of the present disclosure.

FIG. 8 is an exemplary diagram of a composite scalar instruction when RAM addressing is used, provided in an example of the present disclosure. As shown by FIG. 8, if the operand address field is a RAM address, the addressing mode flag bit is 11. The source operand 1 and the source operand 2 exist respectively in the RAM units corresponding to the RAM addresses. Among them the fixed-point data exists in the RAM units corresponding to the RAM addresses 0000H to 1FFFH; and the floating-point data exists in RAM units corresponding to the RAM addresses 2000H to 3FFFH.

In the related instructions using the above addressing modes, the target address field stores the target register number or the target RAM address. The fixed-point data is stored in registers numbered 0 to 7 or in RAM units with addresses ranging from 0000H to 1FFFH; and the floating-point data is stored in registers numbered 8 to 15 or in RAM units with addresses ranging from 2000H to 3FFFH.

Figure 9:
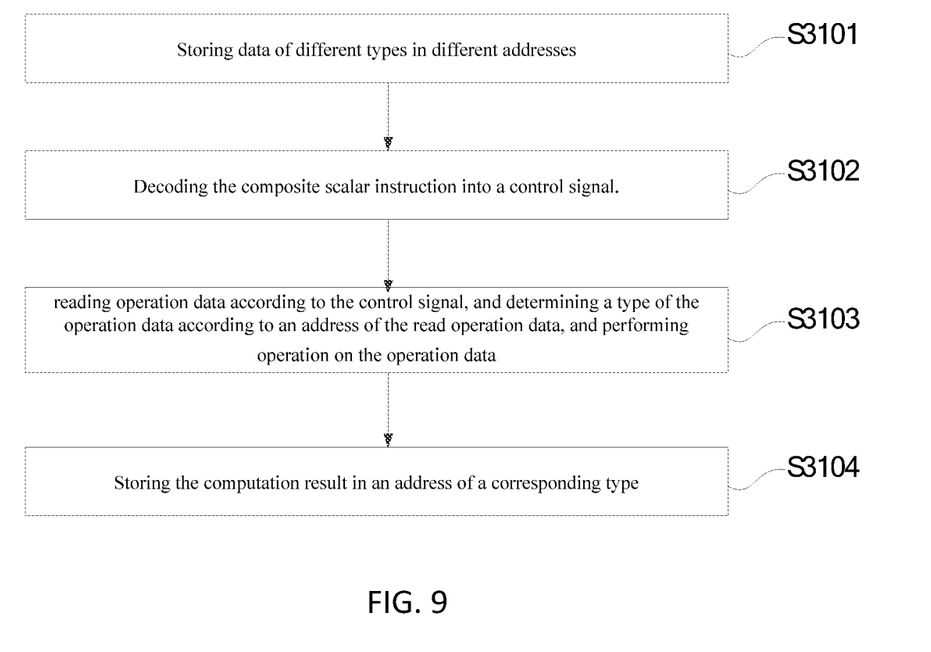
FIG. 9 is a flowchart of a computation method which supports composite scalar instructions provided in an example of the present disclosure.

FIG. 9 is a flowchart of a computation method for supporting a composite scalar instruction provided in an example of the present disclosure. As shown by FIG. 9, the example of the present disclosure provides a computation method for supporting the composite scalar instruction, which performs data operation by using the above-described device supporting a composite scalar instruction, which specifically includes the following steps:

S3101: storing data of different types in different addresses.

The storage module may store the floating-point data and the fixed-point data in spaces corresponding to different addresses, for instance, different RAM addresses or different register numbers.

S3102: decoding the composite scalar instruction into a control signal.

The controller module may send an input/output (IO) instruction to the storage module, read the composite scalar instruction from the storage module, and store the composite scalar instruction in a local instruction queue. The controller module may read the composite scalar instruction from the local instruction queue and decode it into a control signal.

S3103: reading operation data according to the control signal, and determining a type of the operation data according to an address of the read operation data, and performing operation on the operation data.

After receiving the control signal from the controller module, the computing module can determine whether the read data is floating-point type data or fixed-point type data by reading the operand address field. If the operand is an immediate operand, the type of the operand may be determined and operated according to the data type flag bit; if the operand comes from the RAM or register, the type of the operand may be determined according to the RAM address or the register number, and the operand may be read from the storage module to undergo corresponding operation.

S3104: storing the computation result in an address of a corresponding type.

The controller module may send an JO instruction to the computing module, and the computing module may transmit an operation result to the storage module or the input/output module.

As can be seen from the above example, the method for executing the composite scalar instruction provided by the present disclosure can execute the composite scalar instruction accurately and efficiently. The provided device supporting the composite scalar instruction may provide an efficient execution environment for the composite scalar instruction; and the provided method for executing the composite scalar instruction can execute the composite scalar instruction accurately and efficiently.

Some examples further disclose a chip, which may include the aforesaid processing device.

Some examples further disclose a chip package structure, which may include the aforesaid chip.

Some examples further disclose a board card, which may include the aforesaid chip package structure.

An example further discloses electronic apparatus, which may include the aforesaid board card.

The electronic apparatus may include, but is not limited to, robots, computers, printers, scanners, tablets, smart terminals, mobile phones, driving recorders, navigators, sensors, webcams, cloud servers, cameras, video cameras, projectors, watches, headphones, mobile storage, wearable apparatuses, vehicles, household appliances, and/or medical equipment.

The vehicles may include airplanes, ships, and/or cars; the household appliances may include televisions, air conditioners, microwave ovens, refrigerators, rice cookers, humidifiers, washing machines, electric lamps, gas stoves, and range hoods; the medical equipment may include nuclear magnetic resonance instruments, B-ultrasound instruments, and/or electrocardiographs.

In the examples provided by the present disclosure, it should be understood that the related device and method disclosed may be implemented in other manners. For instance, the device examples described above are merely illustrative. For instance, the division of the part or module is only a logical function division. In actual implementation, there may be another division manner, for instance, multiple parts or modules may be combined or may be integrated into one system, or some features can be ignored or not executed.

In the present disclosure, the term "and/or" may have been used. As used herein, the term "and/or" means one or the other or both (e.g., the phrase "A and/or B" means "A or B", or "both A and B").

In the above description, for purposes of explanation, numerous specific details are set forth in order to provide a thorough understanding of various examples of the present disclosure. However, it will be obvious for a person skilled in the art that one or more other examples can also be implemented without some of these specific details. The specific examples described are not intended to limit the present disclosure but to illustrate it. The scope of the present disclosure is not to be determined by the specific examples provided above but only by the following claims. In other instances, known circuits, structures, apparatuses, and operations are shown not in detail but in block diagrams so as not to obscure the understanding of the description. Where deemed appropriate, the reference numerals or the end portions of the reference numerals are repeated among the drawings to indicate corresponding or similar elements optionally having similar characteristics or the same features, unless specified or obvious otherwise.

Various operations and methods have been described. Some methods have been described by way of flow chart in a relatively basic manner, but these operations can optionally be added to and/or removed from these methods. In addition, although the flowchart shows specific sequences of operations according to various exemplary examples, it is to be understood that the specific sequences are exemplary. Alternative examples may optionally perform these operations in different ways, combine certain operations, interlace some operations, etc. The modules, features, and specific optional details of the devices described herein may also optionally be applied to the methods described herein. In various examples, these methods may be executed by and/or executed within such devices.

In the present disclosure, respective functional parts/units/sub-units/modules/sub-modules/means may be hardware. For instance, the hardware may be a circuit including a digital circuit, an analog circuit, and the like. Physical implementation of hardware structures may include, but is not limited to, physical devices, and the physical devices may include but are not limited to transistors, memristors, and the like. The computation module in the computation device may be any suitable hardware processor such as a CPU, GPU, FPGA, DSP, ASIC, etc. The storage unit may be any suitable magnetic storage medium or magneto-optical storage medium such as RRAM, DRAM, SRAM, EDRAM, HBM, HMC, etc.

Persons skilled in the art can clearly understand that for convenience and conciseness of description, the division of the above-mentioned functional modules is illustrated only as instances, and in practical application, the above-mentioned functions can be assigned to different functional modules to complete according to the needs. In other words, the internal structure of the device can be divided into different functional modules to complete all or a part of the functions described above.

The specific examples described above further explain the purpose, technical solution, and technical effects of the present disclosure in detail. It should be understood that the above description only relates to specific examples of the present disclosure and is not intended to limit the present disclosure, and any modifications, equivalent substitutions, improvements, etc. made within the spirit and principles of the present disclosure should all be included within the scope of protection of the present disclosure.

What is claimed is:

1. A device supporting a composite scalar instruction comprising:
   a storage circuit configured to store a composite scalar instruction and multiple types of data, wherein the multiple types of data are respectively stored in different addresses in the storage circuit in accordance with the types;
   a controller circuit configured to read the composite scalar instruction from the storage circuit and decode the composite scalar instruction into a control signal; and
   a computing circuit configured to:
      receive the control signal from the controller circuit,
      read data from the storage circuit,
      determine a data type according to an address of the read data, and
      process the read data,
   wherein the composite scalar instruction is an instruction that combines a floating-point instruction and a fixed-point instruction,
   wherein the composite scalar instruction includes an opcode field, an operand address field, and a destination address field,
   wherein a data type is determined according to an address in an address field of the operand upon computation,
   wherein an opcode stored in the opcode field is used for distinguishing operations of different types,
   wherein the operand address field is used for distinguishing types of operands, and
      wherein the target address field is an address where a computation result is stored.

2. The device supporting a composite scalar instruction of claim 1,
   wherein the data stored in the storage circuit includes original data and intermediate data,
   wherein the device further includes an input/output circuit configured to transmit the original data and the composite scalar instruction to the storage circuit, and
   wherein the computing circuit is configured to store an intermediate result of computation in the storage circuit, and transmit a final computation result to the input/output circuit.

3. The device supporting a composite scalar instruction of claim 1,
   wherein the different types of data include floating-point data and fixed-point data,
   wherein the storage circuit includes a register file, RAM, and/or ROM, and
   wherein the different addresses include different RAM address and/or different register numbers.

4. The device supporting a composite scalar instruction of claim 3, wherein the computing circuit is configured to determine whether data read by the computing circuit is floating-point data or fixed-point data according to a RAM address or a register number associated with the data.

5. A composite scalar instruction, comprising:
   an opcode field, an operand address field, and a destination address field,
   wherein an opcode stored in the opcode field indicates operations of different types,
   wherein the operand address field indicates types of operands, and
   wherein the target address field is an address where a computation result is stored,
   wherein the composite scalar instruction is an instruction that combines a floating-point instruction and a fixed-point instruction,
   wherein a data type is determined according to an address in an address field of the operand upon computation,
   wherein an opcode stored in the opcode field is used for distinguishing operations of different types,
   wherein the operand address field is used for distinguishing types of operands, and
   wherein the target address field is an address where a computation result is stored.

6. The composite scalar instruction of claim 5, wherein the operand address field includes a RAM address, a register number, or an immediate operand, and
   the target address field includes a RAM address and a register number.

7. The composite scalar instruction of claim 5, wherein when multiple addressing modes are used for reading data, the composite scalar instruction further includes a flag bit for determining the addressing modes, and
   the multiple addressing modes include register addressing, register indirect addressing, RAM addressing, and immediate operand addressing.

8. A method for supporting a composite scalar instruction comprising:
   storing, by a storage circuit, a composite scalar instruction and multiple types of data, wherein the multiple types of data are respectively stored in different addresses in the storage circuit in accordance with the types;
   reading, by a controller circuit, the composite scalar instruction from the storage circuit;
   decoding, by the controller circuit, the composite scalar instruction into a control signal;
   receiving, by a computing circuit, the control signal from the controller circuit;
   reading, by the computing circuit, data from the storage circuit;
   determining, by the computing circuit, a data type according to an address of the read data; and
   processing by the computing circuit, the read data.

9. The method of claim 8, wherein the data stored in the storage circuit includes original data and intermediate data.

10. The method of claim 9, further comprising:
    transmitting, by an input/output circuit, the original data and the composite scalar instruction to the storage circuit;
    storing, by the computing circuit, an intermediate result of computation in the storage circuit; and transmitting, by the computing circuit, a final computation result to the input/output circuit.

11. The method of claim 8,
wherein the composite scalar instruction is an instruction that combines a floating-point instruction and a fixed-point instruction,
wherein the composite scalar instruction includes an opcode field, an operand address field, and a destination address field,
wherein a data type is determined according to an address in an address field of the operand upon computation,
wherein an opcode stored in the opcode field is used for distinguishing operations of different types,
wherein the operand address field is used for distinguishing types of operands, and
wherein the target address field is an address where a computation result is stored.

12. The method of claim 8,
wherein the different types of data include floating-point data and fixed-point data,
wherein the storage circuit includes a register file, RAM, and/or ROM, and
wherein the different addresses include different RAM address and/or different register numbers.

13. The method of claim 12, further comprising:
determining, by the computing circuit, whether data read by the computing circuit is floating-point data or fixed-point data according to a RAM address or a register number associated with the data.

* * * * *